United States Patent

[11] 3,610,315

| [72] | Inventors | Walter M. Juergens<br>Dover;<br>Oleg Svetlichny, Chelmsford, both of Mass. |
|---|---|---|
| [21] | Appl. No. | 864,981 |
| [22] | Filed | Oct. 9, 1969 |
| [45] | Patented | Oct. 5, 1971 |
| [73] | Assignee | Urban Reclamation Technologies, Inc.<br>Dover, Mass. |

[54] CONTINUOUS STEELMAKING SYSTEM AND PROCESS
20 Claims, 24 Drawing Figs.

[52] U.S. Cl. ............................................. 164/76,
75/43, 75/44 S, 164/266, 266/335, 164/82
[51] Int. Cl. ................................................ B22d 47/00
[50] Field of Search.......................................... 164/76,
266; 75/13, 43, 44 S, 63; 266/34, 33 R, 335

[56] References Cited
UNITED STATES PATENTS

| 3,257,105 | 6/1966 | Heemeyer................... | 266/34 R |
| 3,339,905 | 9/1967 | Tezuka....................... | 266/33 R |
| 3,358,358 | 12/1967 | Jenks et al................. | 164/76 |
| 3,504,429 | 4/1970 | Snelgrove.................... | 164/76 X |

FOREIGN PATENTS

| 1,351,801 | 3/1963 | France ...................... | 164/266 |

*Primary Examiner*—J. Spencer Overholser
*Assistant Examiner*—John E. Roethel
*Attorney*—Morse, Altman & Oates ABSTRACT: A continuous Steelmaking system and process involves supplying iron base solids, removing nonferrous metals therefrom, delivering said iron base solids to a continuous electric melter for conversion to an iron base melt, successively transferring increments of said iron base melt to a series of discrete vessels, successively adjusting the chemical components and thermal energies of said iron base melt increments in said series of discrete vessels to produce steel melt increments meeting predetermined specifications, successively combining said steel melt increments to produce a steel melt composite, continuously casting said steel melt composite to form a continuous billet, and continuously conditioning and working said continuous billet on line to produce a finished steel shape.

FIG. 1
FIG. 1A

INVENTORS
Walter M. Juergens +
BY Oleg Svetlichny
Morse, Altman + Oates
ATTORNEYS

SYMBOLS IN CONNECTION
WITH FIGS. 3 TO 8

SENSORS

| | |
|---|---|
| PYROMETER | •——Pyr |
| CONTACTOR | •——Cont |
| TACHOMETER | •——Tach |
| PRESSURE GUAGE | •——Pr Ga |
| LOAD CELL | •——Lo C |
| FLOW METER | •——Fl M |
| THERMOCOUPLE | •——Ther |
| FLUE GAS GUAGE | •——Flu G |
| SHAFT ENCODER | •——Sh Enc |
| POTENTIOMETER | •——Pot |
| GAMMA RAY LEVEL DETECTOR | •——Ga R |
| ELECTRIC METER | •——E Met |
| SPECTROMETER | •——Spect |

ACTUATORS

| | |
|---|---|
| ELECTROMECHANICAL DRIVE | ——►EM Dr |
| HYDRAULIC ACTUATOR | ——►Hy Ac |
| ELECTROMECHANICAL SWITCH | ——►EM Sw |
| VALVE | ——►Va |

CONTINUOUS STEELMAKING SYSTEM AND PROCESS

BACKGROUND AND SUMMARY

The present invention relates to the metallurgy of iron and steel and, more particularly, to systems and processes for transforming iron bearing ore or scrap to finished steel products.

In prior steel making processes, the steps of heating, melting, and refining, ordinarily, are performed in a single vessel at a particular sequence of temperature and time, thereby producing molten slag and molten steel. The sequential steps of melting, refining, and tapping are associated with an electrical source that: during melting, requires extremely high power; during refining, requires intermediate power; and during tapping requires relatively low or no power. Because the entire procedure is effected in the same system, the initially required high-power source is unnecessarily available at the later low-power stages as well. In consequence, overall investment is unnecessarily high. Also, steel resulting from the foregoing steps, before being poured into a casting machine, must be poured into an intermediate traveling vessel, by which it is transported from the furnace to the casting machine. This intermediate step is concommitant with: extremely high capital investment for heavy duty building foundations and cranes; reduction of refractory life because of the necessity for excessive superheating of molten steel to compensate for heat losses during transport and casting; and loss of yield and increase in labor cost as a result of cutting, inspecting, and milling billets, one-by-one.

The primary object of the present invention is to interrelate the various melting, steelmaking, continuous casting, billet-reheating, surface-conditioning, and hot rolling steps in such a way that (1) metallurgical progress, in the melt and the billet, and (2) mechanical interaction, between adjacent stages, are inherently matched to achieve continuity and expediently redundant to ensure that down time is corrected substantially on line.

More specific objects of the present invention are to provide: separate vessels for the melting and refining steps so that the electrical equipment for the melting step is compatible with its requirement and the electrical equipment for the refining step is compatible with its requirement, the net result being reduction of investment; a series of individually discrete small vessels that are constrained for cyclic motion substantially at a single level through a sequence of stations, including a filling station adjacent to the melting vessel, a steelmaking station into which chemical additives and energy are introduced, a transfer station at which ready steel is transferred to a holding furnace for a continuous casting machine, a lining repair station at which the interior of the vessel is sprayed with a refractory, and a weighing station for the newly prepared vessel before recycling; continuously operable, sequentially disposed subsystems for casting, preheating, induction heating, surface conditioning and hot rolling, on line with the continuous casting machine, for reception of a continuous billet that remains uncut until it assumes its final form; and duplicate subsystems capable of replacing the aforementioned subsystems expediently via an interacting network of tracks.

Other objects of the present invention will in part be obvious and will in part appear hereinafter.

The invention accordingly comprises the systems and processes involving the components, steps and interrelationships, which are explained in the present disclosure, the scope of which will be indicated in the appended claims.

BRIEF DESCRIPTION OF THE DRAWINGS

For a fuller understanding of the nature and objects of the present invention, reference is made to the following detailed description, together with the accompanying drawings, wherein.

DETAILED DESCRIPTION

Figures 1, 1A:
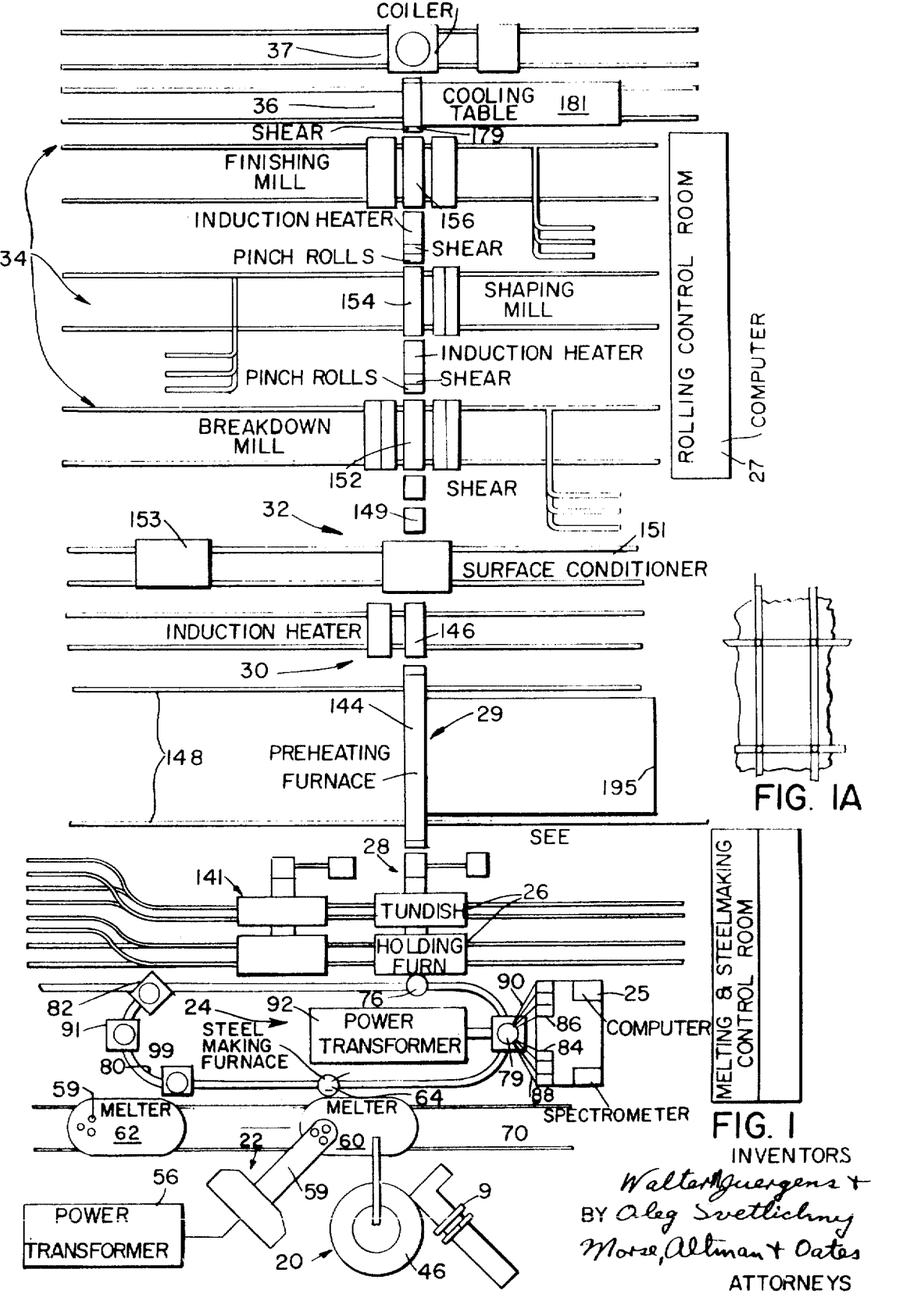
FIG. 1 is a top schematic view of a system embodying the present invention.
FIG. 1A is a fragmentary top plan view of a component of the system of FIG. 1.
Figure 2:
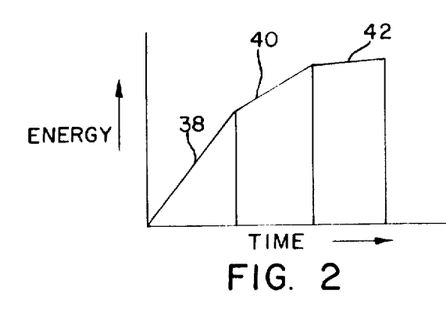
FIG. 2 is a curve of energy versus time, relating to conventional electric furnace steelmaking processes and illustrating certain principles of the present invention.

The General System—FIGS. 1 and 2

The system illustrated herein as an example of an embodiment of the present invention comprises: a subsystem 20 for preheating scrap and removing nonferrous metals therefrom; a subsystem 22 for continuously heating the product of subsystem 20 to a liquid melt; a subsystem 24 for repetitively converting increments of the melt of subsystem 22 to molten steel; a subsystem 26 including a holding furnace and a tundish vessel for continuously supplying molten steel on line; a subsystem 28 for continuously casting molten steel from subsystem 26 to provide a continuous billet; a subsystem 29 for optionally preheating the continuous billet for advancement into succeeding subsystems or cutting the billet into sections in the event that succeeding subsystems are inoperative; a subsystem 30 for induction heating the continuous billet before rolling; a subsystem 32 for surface conditioning the continuous billet; a subsystem 34, including a breakdown mill train, a forming mill train, and a rod mill train, for converting the continuous billet to a continuous shape; a subsystem 36 at which cutting and cooling of the continuous shape is effected for inventory establishment; and a subsystem 37 for coiling the continuous shape when it is in the form of wire. In the illustrated system, the operative melter of subsystem 22, the operative holding and tundish vessels of subsystem 26, the operative preheating furnace of subsystem 29, the operative induction heater of subsystem 146, the operative surface conditioner of subsystem 32, the operative mills of subsystem 34, the operative shear of subsystem 36 and the operative coiler of subsystem 37 are all constrained for movement on associated tracks 70 and can be replaced by identical counterparts also constrained for movement on tracks 70.

One advantage of the present system is illustrated in FIG. 2, wherein the three stages of a typical steelmaking process are represented as a curve of energy versus time. The slope of the curve at any point represents power consumption. It will be noted that: during melting, as indicated at 38, a steep slope indicates high-power consumption; during transport, as indicated at 40, a moderate slope indicates intermediate power consumption; during tapping, as indicated at 42, a gradual slope indicates low or no power consumption. As suggested above, in conventional processes, the same power source is associated with melting, transporting and tapping. Since this power source must deliver full high power during melting, it need deliver only partial power during transport and tapping. In consequence of this idle capacity, capital investment is inefficient. By contrast in accordance with the present invention, melting, transporting and tapping are sufficiently distinct to permit the use of separate power sources, which are matched to the high, intermediate and lower power requirements. In consequence of this fully utilized capacity, capital investment is efficient. Also, since the iron base solids supplied to the melting subsystem are preheated on line, the overall requirement on even the melting power source is relatively low.

Separator Subsystem 20 for Preheating

Scrap and Separating Nonferrous Metals

Therefrom—FIGS. 1, 3, 3A, 3B, 3C and 3D

Figure 3:
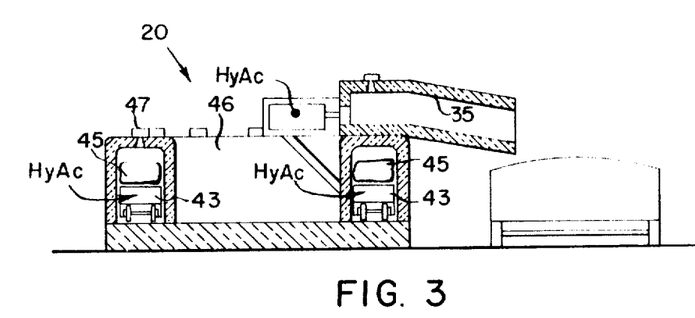
FIG. 3 is a side elevation, partly in section, of portions of a subsystem hereof for preheating scrap and removing nonferrous metals therefrom.
Figure 3A:
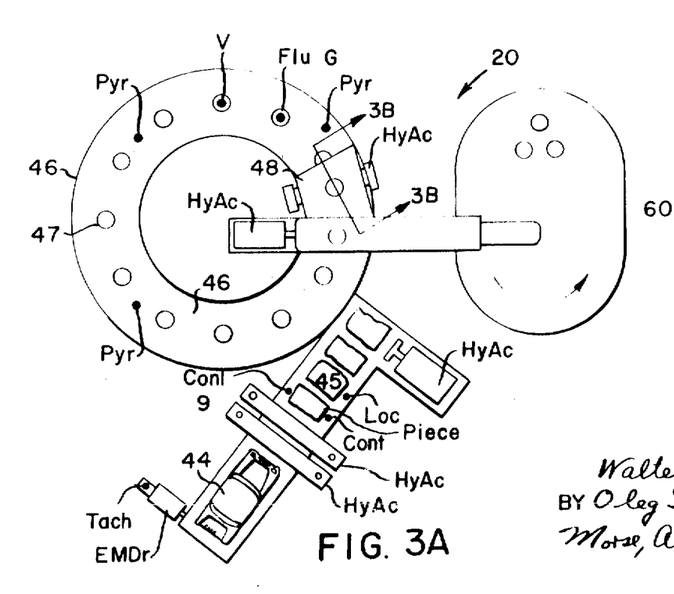
FIG. 3A is a top plan view of the subsystem of FIG. 3.
Figure 3B:
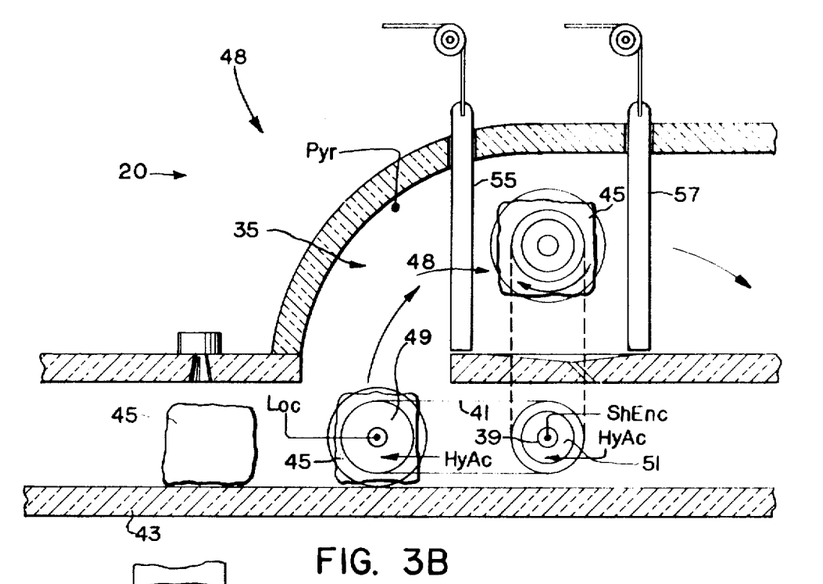
FIG. 3B is an enlarged sectional view, taken substantially along the line 3B—3B of FIG. 3A.

As shown in FIGS. 3, 3A and 3B, subsystem 20 serves to cut an automotive vehicle 44 into scrap sections that typically are approximately 2 feet thick. These sections, which constitute the iron base solids of the illustrated system, are fed into a rotating furnace 46, having gas burners 47 which heat the section to a temperature above the melting point of nonferrous metals to be removed from the section. The successive sections are shown at 45 as being carried by orbiting support 43. As each section 45 advances toward a separation station 48, it is gripped by opposed arms, one of which is shown at 49. Each of these opposed arms has a pivot 39 and a rotating jaw 37. Pivot 39 is located at a fixed position above orbiting support 43 and below a stationary separator 48, now to be described. As a section 45 advances toward separator 48, it is gripped by jaws 49 and lifted by arms 41 into separator 45. While in separator 45, the section is rapidly spun in such a way as to centrifugally separate the molten nonferrous metal from the still solid section. Reciprocable curtains 55, 57 control the trajectory of the nonferrous metal. After separation of the nonferrous metal, arms 41 pivot farther to carry the section in a chute 35 for deposit in melter subsystem 60. Finally arms 51 pivot back to their original positions in time to grip the next advancing scrap section.

Figure 3C:
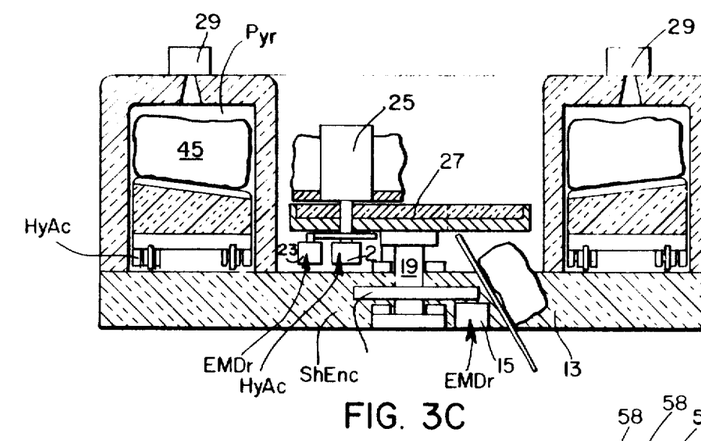
FIG. 3C is a side elevation, partly in section, of portions of an alternative subsystem hereof, for preheating scrap and removing nonferrous metals therefrom.
Figure 3D:
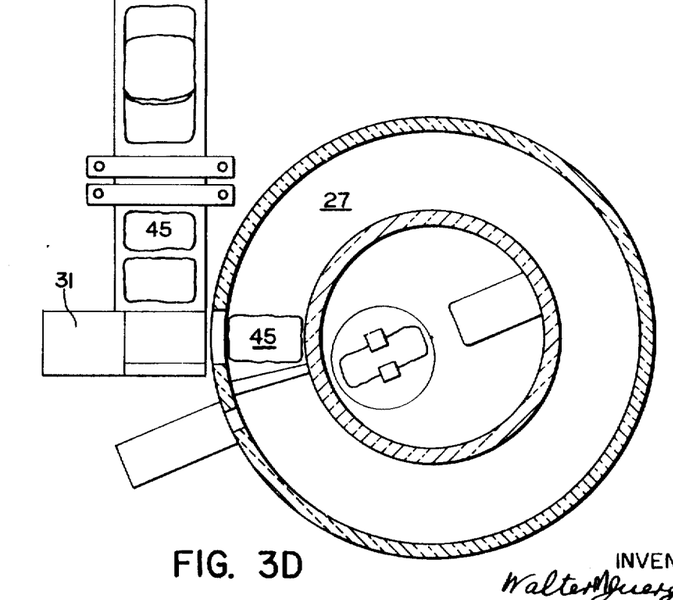
FIG. 3D is an enlarged top plan view of the subsystem of FIG. 3C.

An alternative separator subsystem is shown in FIGS. 3C and 3D as including an orbiting mount 33 for carrying advancing scrap sections, which are supplied in sequence by an actuator 31. Heat is supplied by gas burners 29, which are positioned in the stationary roof of the furnace. A scrap section, which has been heated to above the melting point of the nonferrous metals to be separated, is fed to surface of a centrifuge 27, on which it is clamped by gripping jaws, one of which is shown at 25. Illustrated gripping jaw 25 is shown as being orbitally mounted about the axis of an electromechanical drive 23 and pivotally mounted about the axis of an electromechanical drive 21. When the scrap section is so gripped, centrifuge 27 is spun about an axial shaft 19 that is driven through gearing 17 by an electromechanical drive 15. Following the resulting separation of the molten nonferrous metals, the still solid scrap section is delivered to melter subsection 22 through a chute 13.

In the illustrated system, a single separator subsystem is shown. In an alternative system, two such subsystems are provided in series. The first separation subsystem operates at approximately 1,220° F. for the separation of aluminum and the second operates at approximately 1,950° F. for the separation of copper. In each of the units of FIGS. 3, 3A, 3B and 3C, 3D, the orbiting platform is inclined so as to establish a flow of molten nonferrous metal thereon into capture vessels (not shown). It will be understood that in alternative embodiments of the present system, these separator subsystems are replaced by either a conventioned scrap metal shredder or ore reduction furnace.

Figures 4, 4A:
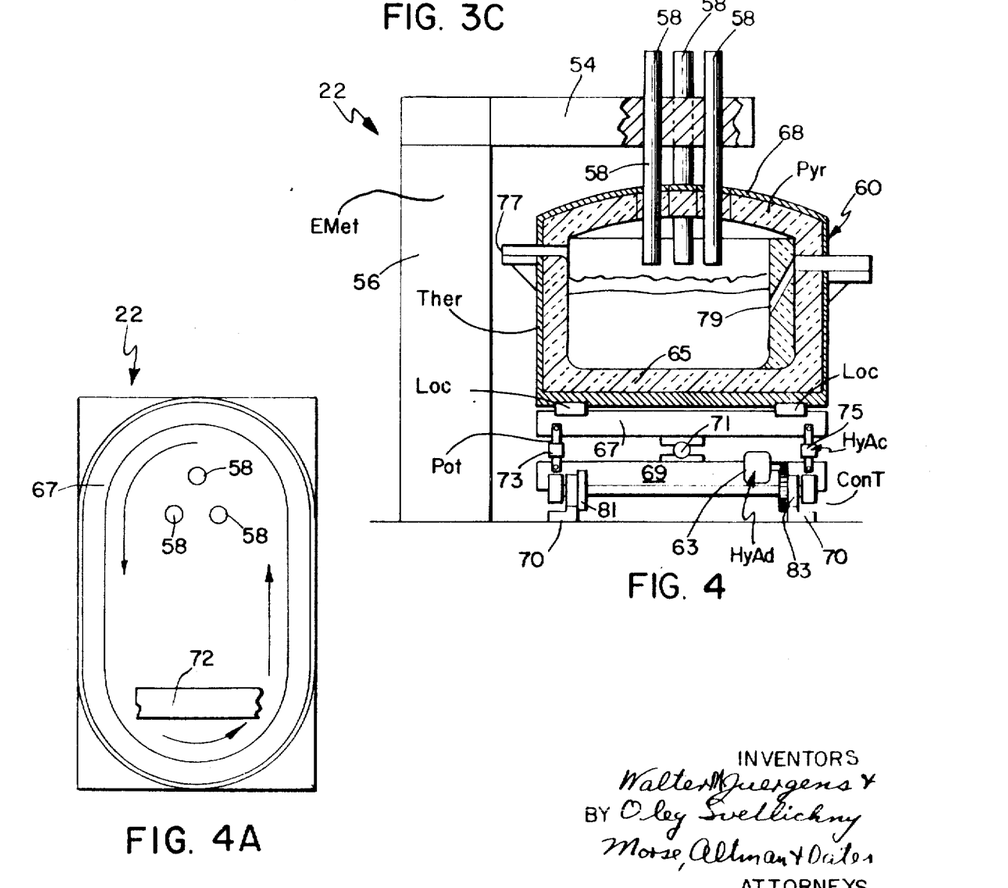
FIG. 4 is a side elevation, partly in section, of part of a melting subsystem hereof.
FIG. 4A is a top plan view of a component of the melting subsystem of FIG. 4.

Melter Subsystem 22—FIGS. 1, 4 and 4A

Subsystem 22 includes an electrode-positioning mechanism 54 and a power transformer 56 for supplying power to a series of electrodes 58, the power being transferred through suitable cables (not shown). As shown, electrodes 58 are in thermal association with the interior the operative one of two interchangeable melting vessels 60, 62. In operation, this operative melting vessel is supplied with scrap sections from subsystem 20. Electrodes 58 can be withdrawn in such a way as to free either melting vessel for replacement by the other. Thus one vessel may be relined while the other is in operation. Generally, electrodes 58 heat the contents of the melting vessel to a temperature ranging between 2,800° and 3,200° F. Then the molten contents incrementally are flowed into steel making vessels 64, one at a time in a manner to be described below. Each time an increment of the melt within a melting vessel is transferred to a steelmaking vessel 64, the metallostatic level of the melt drops but gradually rises because of the continuing introduction of preheated scrap sections from subsystem 20. The three electrodes are part of a three-phase electrical system, each of the three electrodes projecting through one of three holes in a cover 68 of the melting vessel. The height of the electrodes is adjusted so that as the level of the metallostatic head in the melting vessel is raised or lowered, power consumption remains constant. Melting vessels 60, 62 are self-propelled by hydraulic motors, one of which is shown at 63, for selective movement along rails 70, 70.

As shown in FIG. 4A, the cross-sectional shape of each of melting vessels 60, 62 is ellipsoidal, the three electrodes being positioned at one of the foci of the ellipsoidal shape and additional scrap sections being added at the other of the foci of the ellipsoidal shape of avoid damaging the electrodes. This arrangement permits continuous circulation, by which hot spot development in the vicinity of the electrodes is prevented.

As shown in FIG. 4, each melting vessel includes an open top container portion 64, having a steel casing and a refractory lining. The entire vessel is supported on a seat 67, which is pivotally mounted on a carriage 69, both of which are rectangular in horizontal profile. Located between seat 67 and carriage 69 is a central universal pivot 71. Connected between the four pairs of corners of seat 67 and carriage 69 are four hydraulic actuators, two of which are shown at 73, 75. By controlling these actuators, the vessel may be rocked for three purposes as follows: (a) to circulate the melt so as to transfer energy from the arc to the scrap sections; (b) to tilt the vessel so as to pour slag via spout 77; and (c) to tilt the vessel so as to pour the melt via spout 79. The arrangement is such that power is uninterrupted while the vessel is tilted. Platform 69 rides on flanged wheels, two of which are shown at 81, 83.

Figure 5:
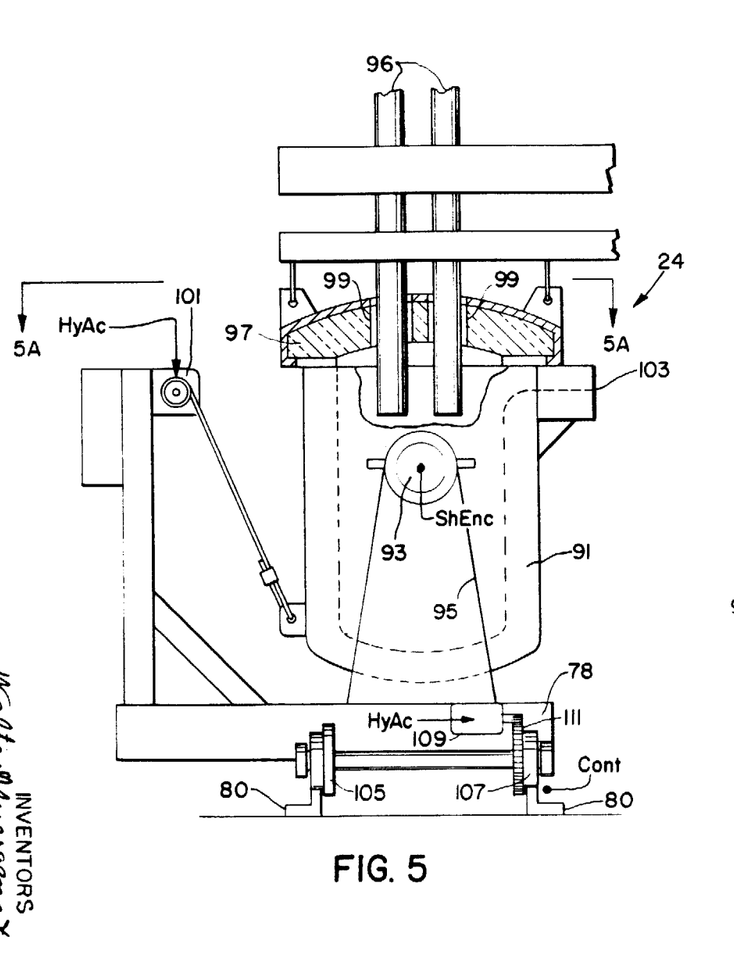
FIG. 5 is a side elevation, partly in section, of part of a steelmaking subsystem hereof.
Figure 5A:
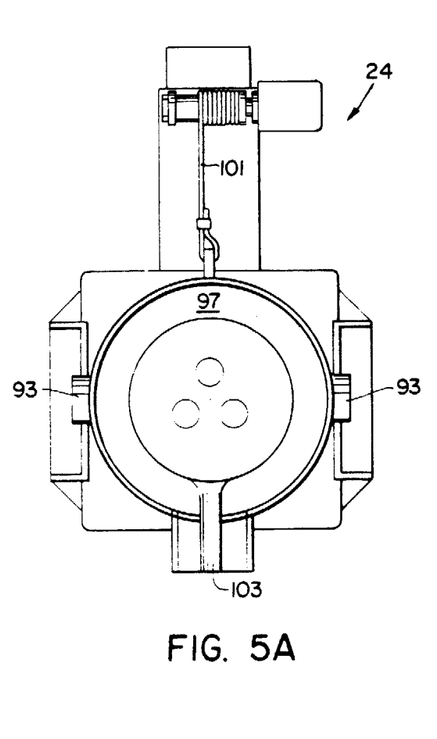
FIG. 5A is a top plan view, partly in section, of a component of the subsystem of FIG. 5.

The Steelmaking Subsystem—FIGS. 1, 5 and 5A

Subsystem 24 comprises a series of steelmaking vessels, three of which are shown at 64, 74 and 76. With reference to FIGS. 5 and 5A, each of these vessels is supported on a self-propelled platform 78, having flanged wheels that constrain the vessel for orbital motion on rails 80, 80. Each of these vessels, with reference to FIG. 1, intermittently stops at the following sequence of stations. At filling station 64, the vessel moves in proximity to melting vessel 60 in order to receive an increment of the melt from spout 79 (FIG. 4). Steelmaking station 74 includes a series of hoppers and tanks 84, 86, which communicate with the vessel through suitable conductors 88, 90. These containers store suitable additives such as ferromanganese, ferrosilicon, coke, limestone, oxygen, etc. Depending upon a spectrometric analysis, the various additives are introduced into the melt in predetermined quantities. The melt is provided with intermediate heat by a small ore furnace that is constituted by a relatively small transformer 92, and associated electrodes 96. Arc furnace 96 supplies heat to compensate for negative heat of reaction, ambient heat loss, and final adjustment of temperature as demanded by casting. From the steelmaking station, the vessel is self-propelled to a transfer station 76, at which it is tilted in order to pour its contents into the holding vessel of the next subsystem. Then the steelmaking vessel is advanced through repair station 82, at which its lining is repaired by spraying with ceramic, and is advanced through a weighing station 91, at which its total weight is measured for information transfer to the central computer. Finally, the vessel is advanced to a holding station 94, before being returned to filling station 64 for repetition of the cycle.

Details of vessels 64, 74, 76 are shown in FIGS. 5, 5A. The vessel shown at 91 is trunnioned at 93 on posts, one shown at 95, which are mounted on a support 78. Lid 97, which is hung above the vessel, has holes 99, through which electrodes 96 project. Electrodes 96 are retractable in order to permit movement of the vessel. The vessel can be tilted by a hydraulic actuator 101, which is operated by a winch, in order to decant slag and to pour steel, both via spout 103. The entire unit rides on wheels 105, 107, which are driven by a motor 109 through gearing 111.

Figures 6, 6A:
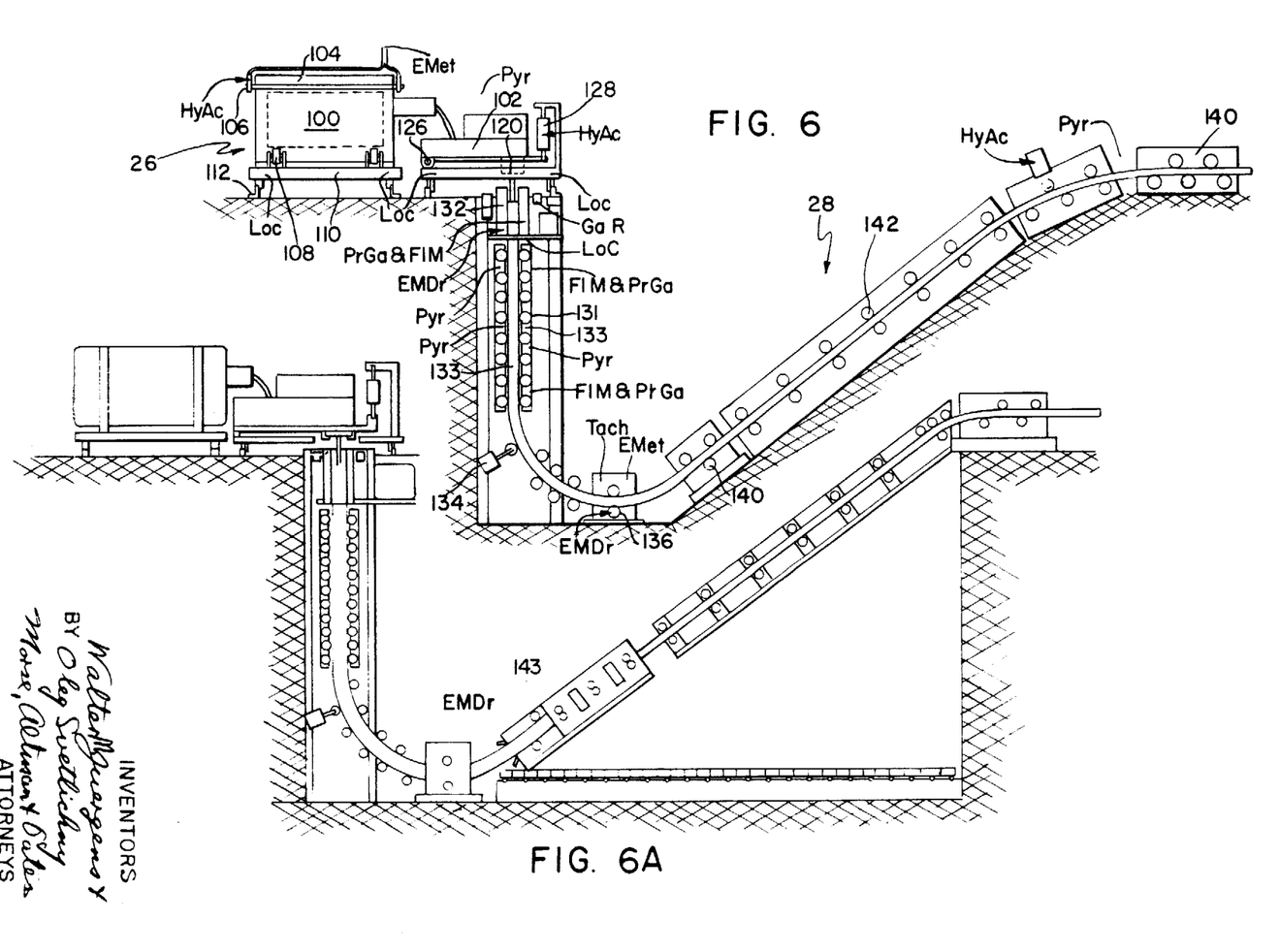
FIG. 6 is a schematic side elevation of a continuous casting subsystem hereof.
FIG. 6A is a schematic side elevation of an alternative continuous casting subsystem hereof.

The Continuous Casting Subsystem—FIGS. 1, 6, 6A

Continuous casting subsystem 26, 28 includes a holding vessel 100, into which the full content of an associated steelmaking vessel is poured, and a tundish vessel 102, which receives the contents of holding vessel 100 continuously for the maintenance of substantially predetermined weight. Vessel 100 is shown as having a cover 104, in which are electric heaters 106 to compensate for heat loss. Vessel 100 is shown as being mounted at 108 for rocking motion under the control of a hydraulic drive (not shown). The holding vessel is supported on a car 110, which is constrained for motion by flanged wheels along rails 112.

Tundish vessel 102 is provided at its floor with a sliding gate having a sequence of nozzles 120, which successively can be moved into operating position automatically as operating nozzles of the sequence become eroded. The operating nozzle is in line with a mold 122 to be described below. The metallostatic head is maintained at a preselected level by pivotal movement of the tundish vessel about a trunnion 126, the orientation of the tundish vessel being under the control of the hydraulic cylinder 128. This level controls flow into the mold. A sensor 130, for example a gamma radiation detector, senses the level of molten steel in the mold in order to generate control signals. Mold 122 oscillates in order to prevent adhesion of frozen shell thereto. Below the mold is a roll rack 131 and water spray chamber 133. Channel 132, through which the partially formed billet advances after leaving the roll rack, is constrained by bending rolls 134, pinch rolls 136, straightening rolls 140, and guide rolls 142. Although the present system illustrates the use of pinch rolls underground in association with the channel, it will be understood that these pinch rolls alternately can be positioned at ground level.

In the alternative system of Fig. 6A, on line reduction rolls serve to reduce the cross section of the billet while the center of the billet is not yet solidified.

The Preheating Subsystem—FIG. 1

The continuous billet, after advancement from continuous casting subsystem 26, 28, is preheated to hot rolling temperature, approximately 2,400° F., by a two step system including a preheating furnace, for example a gas fire surface 144, and an induction heating unit, for example an induction heating coil 146. Preheating unit 144 is arranged to be removable from its on line position via tracks 148 in order to enable its association with either of the two illustrated continuous casting machines. In the event of an interruption in the remainder of the system, the billet can be cut into lengths at this point for transfer to a cooling table 145.

The On Line Conditioning Subsystem—FIG. 1

Surface conditioning subsystem 32 includes a sand or shot blasting unit which removes scale from the advancing billet. This unit is followed by a short temperature recovery zone 149, at which the surface temperature of the billet rises by conduction of heat from within the billet. The surface conditioning unit, shown at 32, is movable on a pair of tracks 150 in order to permit its alignment with one of the other of continuous casting machines or to permit its replacement by a backup unit 153 in the event of failure.

Figure 7:
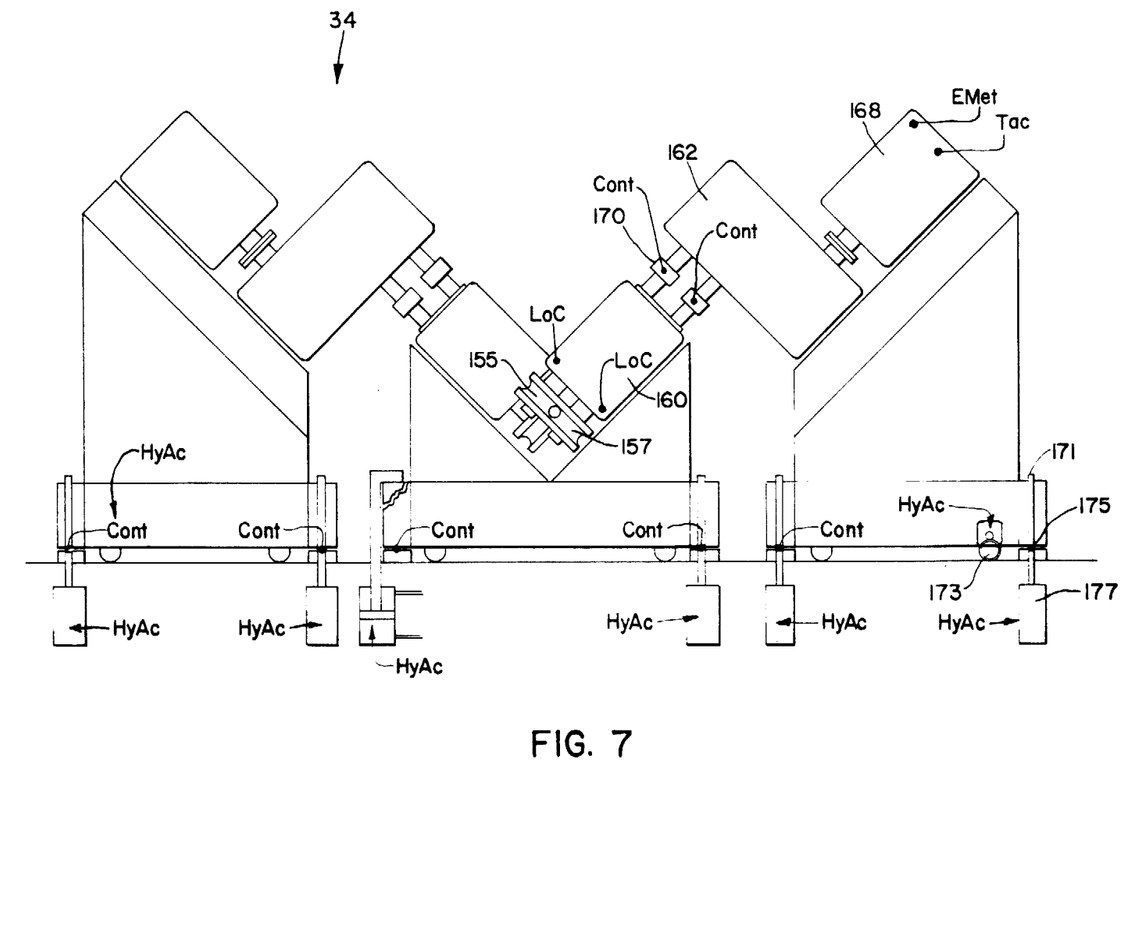
FIG. 7 is a front elevation of part of a rolling mill subsystem hereof.
Figure 7A:
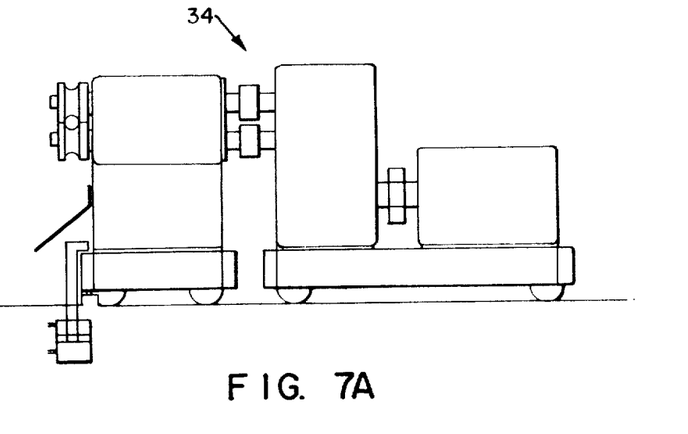
FIG. 7A is a front elevation of another part of a rolling mill subsystem hereof.

The Rolling Subsystem—FIGS. 1, 7 and 7A

Rolling subsystem 34 includes three trains of rolls with induction heating units therebetween. These three trains include a breakdown roll train 152, a forming roll train 154, and a rod mill 156. As shown in Fig. 7, train 152 includes a series of pairs of cantilever rolling mills 155, 157. These rolls are affixed at the ends of shafts projecting from a housing 160 which contains a mechanism by which the centers of the rolls can be adjusted with respect to each other as the rolling process continues, a maximum adjustment being made withing the span of approximately one-half inch. The shafts are driven through gear reduction boxes 162 by an electric motor 168. In FIG. 7, pairs of rolls 155, 157 are shown rotatably mounted about axes which are at right angles to each other.

In forming roll train 154, as shown in FIG. 7A, the axes of the rolls are parallel to each other and horizontal. The orientation of the roll axes in rod mill 156 is similar to that shown in FIG. 7. In each case, the various sections of the roll trains are mounted on individual tracks in order to enable replacement of defective units and/or replacement of one selected roll shape by another selected roll shape, as desired. In various forms, rod mill 156 is constructed analogously to either forming mill train 154 or breakdown mill train 152. Such replacement can be effected rapidly by virtue of the following structure.

As shown, each unit is resiliently supported on four spring-loaded wheels 172. At the four corners of each unit, when in operating position are four hooks 171, one of the hooks being incorrectly shown as rotated about its axis to illustrate details. When operated by four hydraulically actuated locks, the four hooks cause compression of the four springs at the four wheels and connect the four corners of the unit to four positioning pairs 175. The various units of the mill are capable of being quickly disconnected from reduction drives 162 by couplings 170.

At the end of each roll train are shears and pinch rolls, the shears being needed to cut the billet into predetermined lengths and the pinch rolls being needed to retract portions of a billet remaining in the mill. It is to be noted that the cast billet preferably is circular in cross section. Should a square shape be intended, it is produced in the rolling subsystem. The primary benefit of this arrangement is the ease of uniform heating of the billet prior to rolling.

The Final Shear, Cooling Table and Coiler Subsystems—FIG. 1

Subsystem 36 includes a shear 179 for cutting the final shape into predetermined lengths and a cooling table 181 for transversely moving lengths of final product into inventory. It will be understood that the final product may have any cross-sectional shape including round, angular, square, channel, T, etc. When making wire rod, the shear and cooling table are moved out of operating position on their racks and coiler subsystem 37 is moved into operating position on its tracks. After a certain weight has been coiled, the wire rod is cut and coiling is continued on another spool.

EXAMPLE

The following nonlimiting example will further illustrate the present invention.

The illustrated system contemplates a unit capable of producing 100,000 tons of steel shape per year. This corresponds to 360 tons per day at 15 tons per hour or one automobile body in 5 minutes. From shear 9, scrap section is advanced into furnace 46, which has an internal dimension of approximately 3×7 feet and is fired by natural gas or fuel oil. At stage 48, approximately the melting point of copper, is reached. The annular length of the furnace ranges from approximately 10 to 40 feet. The width of tunnel 46 is sufficient for reception of a section of approximately 7 feet. Melting vessel 60 has a minor diameter of approximately 5 to 8 feet and a capacity of approximately 15 to 20 tons of melt. The melting vessel ranges in temperature approximately between 2,800° and 3,000° F. Each of steelmaking vessels 64, 74, 76 has internal dimensions of approximately 3 by 5 feet, the total capacity being approximately 5 to 7 tons of melt. The temperature maintained in each steelmaking vessel ranges between 2,800° and 3,000° F. The time cycle of steel making is dependent on the time that any particular vessel remains in steelmaking station 74, a typical time ranging between 15 and 25 minutes. Thus, in a typical system, approximately three to four complete cycles can be performed in 1 hour. The continuous casting and rolling operations are performed at the rate of 15 tons per hour, the temperature of the billet leaving the continuous casting machine ranging in temperature approximately from 1,750° to 2,000° F., the temperature of the surface in preheating subsystem 29 being approximately 2,200° F., the temperature of the billet leaving the induction furnace being approximately 2,400° F., the temperatures at the roll mills being approximately the same but there being a slight drop in temperature between roll mills. Induction heating is used between adjacent rolling mills to maintain the temperature at hot rolling levels. A typical billet for example is approximately 4 to 6 inches in diameter.

Figure 8:
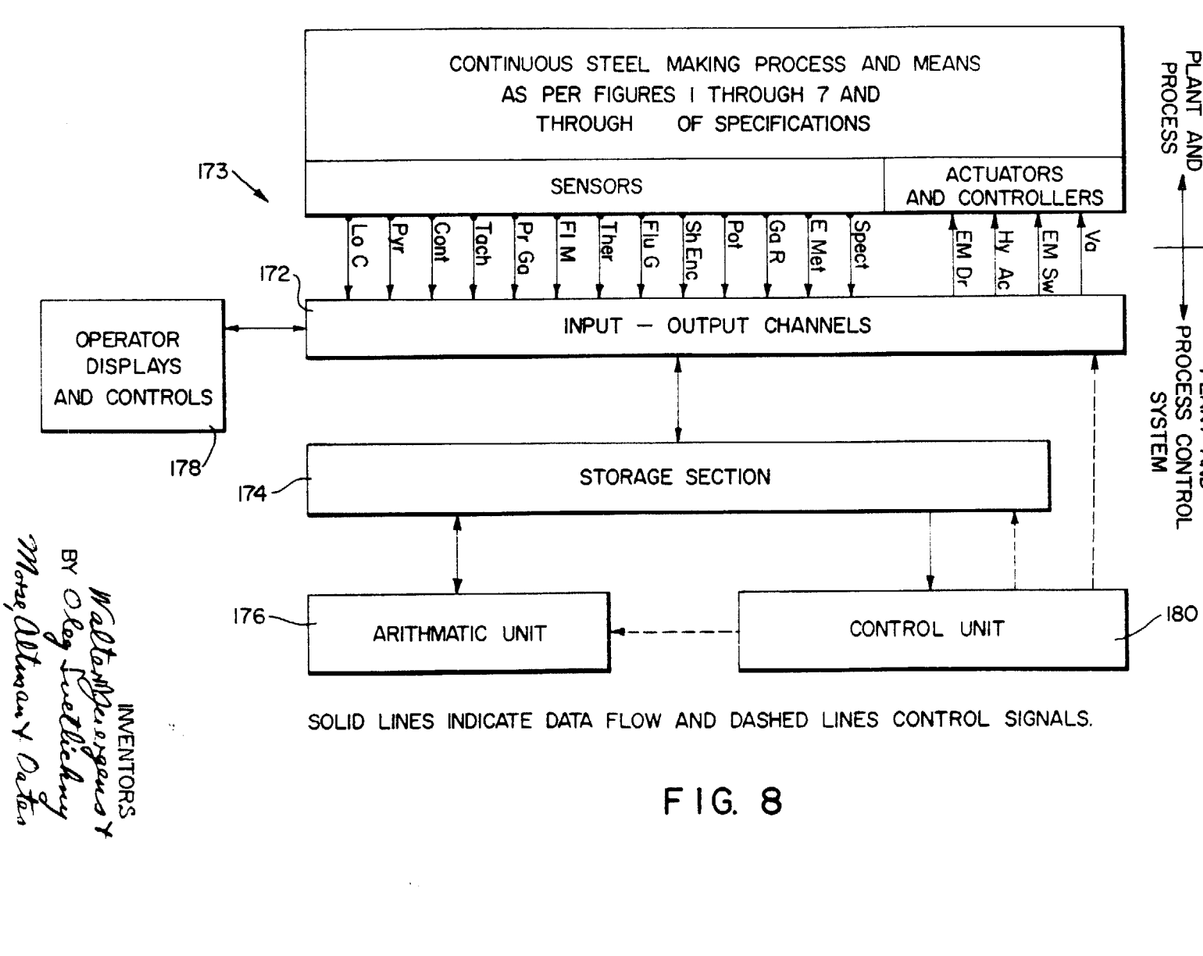
FIG. 8 is a block diagram of a computer control subsystem hereof.
Figure 8A:
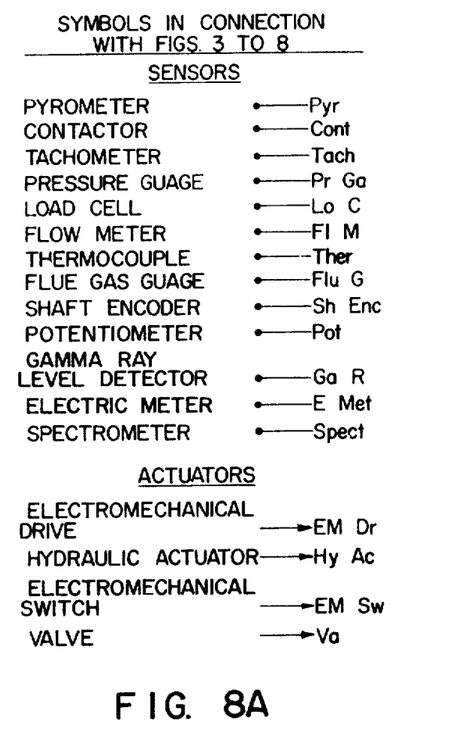
FIG. 8A is a diagram illustrating symbols and designations in connection with elements of FIGS. 3–8.

Operation and the Computer Control—FIGS. 1, 8 and 8A

The operation of the system of FIG. 1 is controlled by the computer of FIG. 8 through the sensors and actuators listed in FIG. 8A, which are designated by way of example in FIGS. 2 through 7.

Among these sensors and actuators are the following: a load cell at melting vessel 58 to determine weight; temperature sensors for the outside skin of the melting vessel to determine the refractor state; an electropositioning control to maintain correct powerload at 58; a position indicator to indicate the translational position of the vessel mechanically; load cells at the steelmaking, weighing and loading stages of steelmaking subassembly 24; orbital position indicators and automatic blocks for indicating the positions of all steelmaking vessels along track 80; temperature measuring devices associated with steelmaking station 82; measuring devices to meter solid additions to the steelmaking station; load cells at the holding and tundish vessels to indicate casting speed; a sensor for indicating position of any metallistatic head; a detector for indicating the speed at which the pinch rolls rotate; a flow meter for indicating rate of water flow to cooling section 124 and the pressure of the water; a surface temperature indicator, pyrometer type, for measuring temperature of the billet as it leaves the continuous casting subsystem; a temperature sensor at the end of the preheating furnace and temperature sensors at the entries of the first and second roll stages; speed indicators and speed sensors at every movable unit; temperature sensors at various points along the billet; contactors as position indicators at critical positions along the rails; and operated guidance-type control for input/output system 172 which can be used by an operator or observer in the event one or another of the components of the system is inoperative. In the event that the feedback system is inoperative, the system can be operated open loop. As shown in Fig. 8, signals from these sensors and to these actuators are associated with the input/output channels of a computer 174, having a storage section 174, an arithmetic unit 176, a control unit 180 and operator displays and controls 178.

Figure 9:
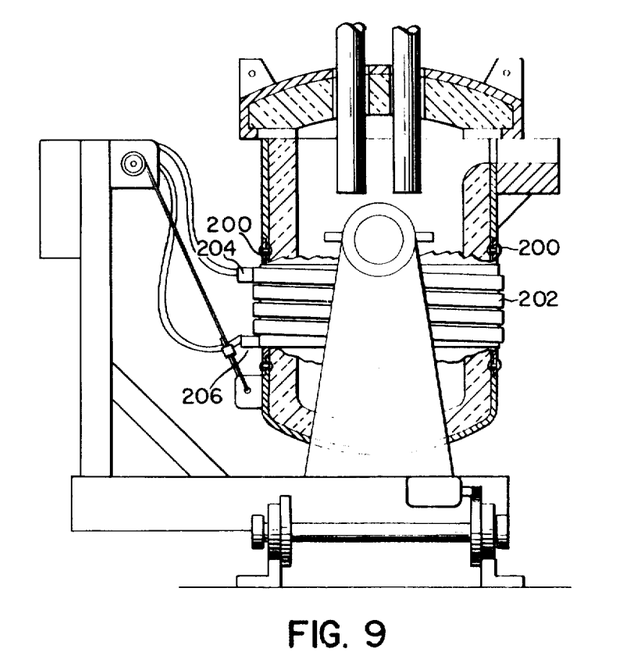
FIG. 9 is a front elevation, partly in section, of an alternative melting subsystem.
Figure 9A:
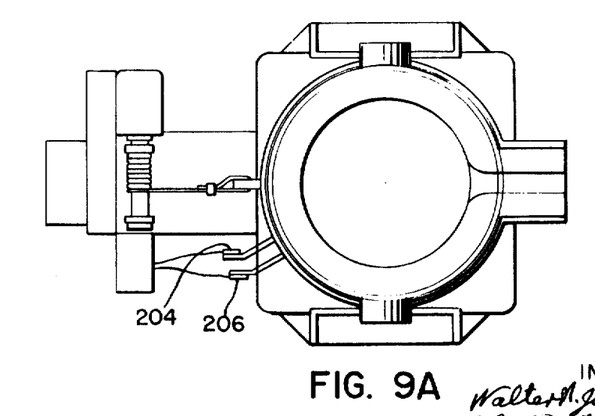
FIG. 9A is a top plan view of the subsystem of FIG. 9.

The Steelmaking Subsystem Modification—FIGS. 9 and 9A

In the modification of FIGS. 5 and 5A; shown in FIGS. 9 and 9A, water-cooled copper coil around the steelmaking vessel is added for the purpose of mixing the contents of the vessel by an electromagnetic field. As shown, generally this subsystem is analogous to the subsystem of FIGS. 5 and 5A.

However, in the present subsystem, an intermediate portion of the shell of the vessel, as at 200, is composed of stainless steel in order to enable the transmission of the electromagnetic flux created by a coil 202, which is turned about the vessel in the vicinity of portion 200. As shown, coil 202 is a hollow copper tube having an inlet 204 and an outlet 206, through which water coolant and electrical power both are transmitted.

In the illustrated embodiment, the number of turns is shown as being four, by which the system is adapter for at most 500 kilowatts at a frequency of one-half of 2 cycles per second. The function of the stirring is to speed up the steelmaking process by increasing the speed of dissolution of additives such as ferroalloys, coke, etc.

Figures 10, 10A:
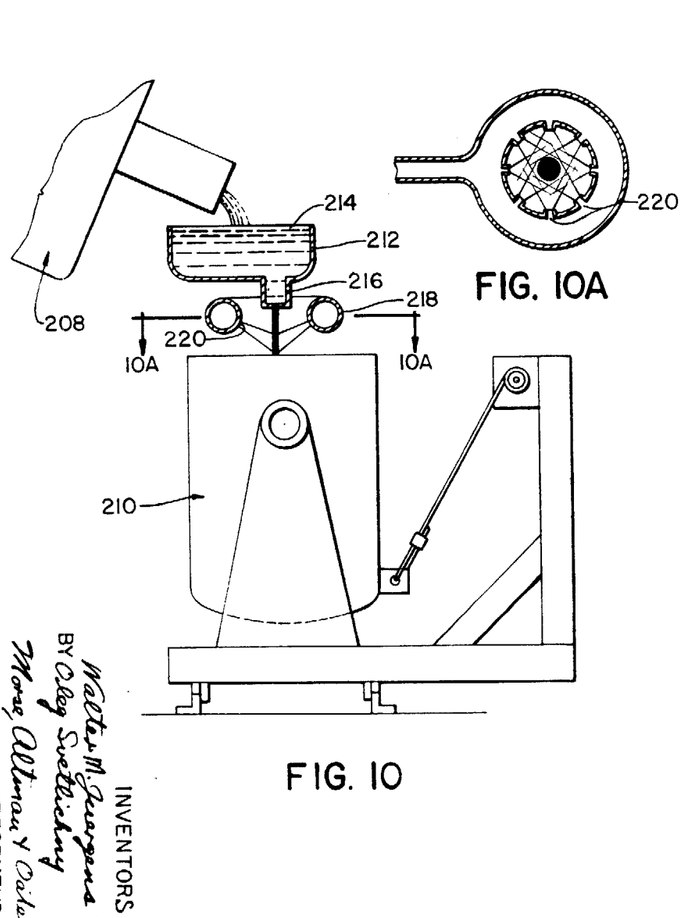
FIG. 10 is a side elevation, partly in section, of part of an alternative steelmaking subsystem hereof.
FIG. 10A is a cross-sectional view, taken substantially along the lines 10A—10A of FIG. 10.

The Steelmaking Subsystem Modification—FIGS. 10 and 10A

A further modification of the steelmaking component of FIGS. 5 and 5A is illustrated in FIGS. 10 and 10A.

When the raw materials are such that pellets, pig iron or scrap containing high carbon or silicon concentration, in order to speed up the refining process, an additional component or steelmaking stage is interposed between the melting vessel, shown at 208, and the steelmaking vessel, shown at 210. This additional component, shown at 212, includes a tundish vessel 214, a nozzle 216 and a spray mixer 218 in the form of a ring having a multiplicity of nozzles 220 at its lower periphery, for the injecting into the molten flowing stream such additives as oxygen, powdered lime, etc.

The purpose of this subsystem is to bring into close proximity the melt and the additives. As a result, the carbon, silicon, sulfur and phosphorous are drastically reduced in such a way as to bring the final composition of the melt to proportions which roughly correspond to the final specifications desired. The final adjustments of the composition then take place in the usual way, in the steelmaking subsystem previously described. Thus, spray mixer 212 extends the capability of the overall system to include raw materials that contain high concentrations of undesired sulfur, silicon, carbon, manganese, phosphorous, etc.

Figure 11:
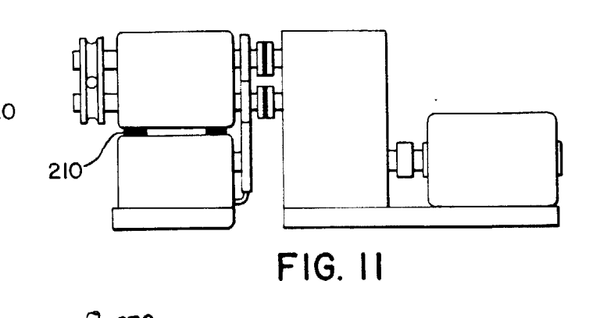
FIG. 11 is a side view of part of an alternative rolling mill subsystem hereof.
Figure 11A:
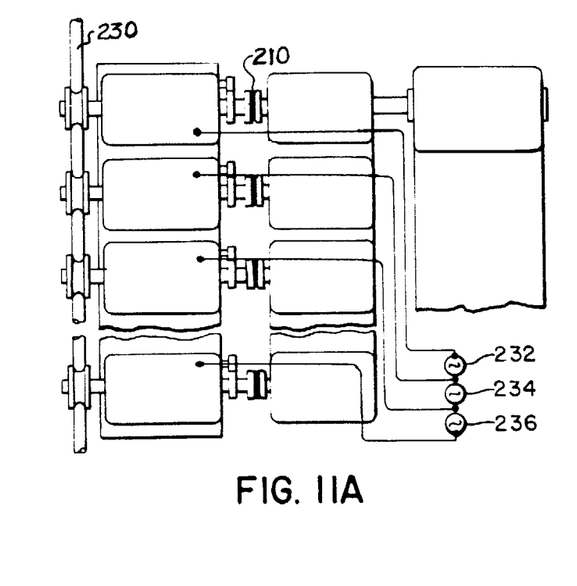
FIG. 11A is top plan view of the alternative rolling mill subsystem of FIG. 11.

An Alternative Rolling Mill—FIGS. 11 and 11A

Normally the billet in a rolling mill moves so fast that heat losses from the billet to the surrounding environment are minimized.

In the present process, the rolling mill is coupled to the continuous casting process so that billet formation is relatively slow. As indicated above, in order to solve the problem of heat loss, induction heating subsystems are introduced between the rolling mill trains. In the subsystem of FIGS. 11 and 11A, an alternative means of solving the heat loss between the rolling trains is provided.

This alternative subsystem, as shown if FIGS. 11 and 11A, involves the principle of resistance heating. In this system each pair of rolls also is used as electrodes terminals. Between each pair of rolls, a current is passed thru the billet 230 whereby resistance heating occurs. Since the cross section of the billet changes between two consecutive sets of rolls, the power required for preheating varies. Accordingly there are separate power sources 232, 234, 236 for each pair of adjacent rolls. In order to prevent undesired grounding, each drive mechanism for each pair of rolls is insulated, as at 210, so that grounding does not occur. Also the entire mill train is electrically insulated from the remaining subsystems in order to prevent grounding therethrough.

An Alternative Preheating System—FIGS. 3 and 3A

In order to prevent oxidation in the melting furnace and to carburize the melt partially without introducing sulfur, in one process of the present invention, powdered carbonaceous material such as carbon powder, powdered coat, and fluid pitch are introduced by spraying onto the scrap sections, following the shear and before introduction into the rotating furnace. This prevents oxidation because (1) any oxide formed in the furnace requires the application of unnecessarily high power to remove it, and (2) carbon is introduced without the attendant production of sulfur thereby decreasing the amount of slag and power. At this point, the diffusivity of carbon is several orders of magnitude greater than the diffusivity of sulfur, whereby carbon is interdiffused into the scrap section and sulfur is rejected with excess carbon luring centrifuging.

Modification of FIG. 1

In a modification of FIG. 1, the two continuous casting machines are designed to converge toward the remaining subsystem, the driving mechanisms and other auxiliary mechanisms being common as needed to both. Thus, the casting machines are continuous to the pinch rolls, after which two sets of pinch rolls and the remainder of continuous casting machine is duplicated. With reference to FIG. 6, in the presently discussed system, the train is divided at point 136 so that bending occurs in both the vertical and horizontal planes, the paths being joined again at point 140. The advantages of this construction are lower capital investment and simplified controls.

Since certain changes may be made in the foregoing description or the accompanying drawings without departing from the scope of the present disclosure, it is intended that all matter described herein be interpreted in an illustrative and not in a limiting sense.

What is claimed is:

1. A continuous steelmaking process comprising the steps of supplying iron base solids to a continuous electric heater for conversion to an iron base melt, successively transferring increments of said iron base melt to a series of discrete vessels, successively adjusting the chemical components and thermal energies of said increments of said iron base melt in said series of discrete vessels to produce increments of molten steel or predetermined specifications, successively combining said increments of molten steel to produce a composite steel melt, continuously casting said composite steel melt to form a continuous billet, and continuously conditioning and working said continuous billet on line to produce a finished shape.

2. The continuous steelmaking process of claim 1 wherein said iron base solids are steel scrap.

3. A continuous steelmaking process comprising the steps of supplying iron base solids to a continuous electric heater for conversion to an iron base melt, successively transferring increments of said iron base melt to a series of discrete vessels, successively adjusting the chemical components and thermal energies of said increments of said iron base melt in said series of discrete vessels to produce increments of molten steel of predetermined specifications, successively combining said increments of molten steel to produce a composite steel melt, continuously casting said composite steel melt to form a continuous billet, continuously conditioning and working said continuous billet on line to produce a finished shape, and simultaneously with said steps synchronizing said steps in such a way that adjacent ones of said steps are compatible.

4. The continuous steelmaking process of claim 3 wherein said iron base solids are steel scrap.

5. The continuous steelmaking process of claim 3 wherein said continuous electric heater operates at a temperature ranging between 2,800° and 3,200° F.

6. The continuous steelmaking process of claim 3 wherein said chemical components include members of the class consisting of ferromanganese, ferrosilicon, coke, limestone and oxygen.

7. The continuous steelmaking process of claim 3 wherein said working is effected at a temperature ranging between 2,200° and 2,600° F.

8. A continuous steelmaking system comprising first means for supplying iron base solids, second means for removing nonferrous metals therefrom, third means including a continuous electric melter, delivering said iron base solids to said continuous electric melter for conversion to an iron base melt, fifth means including a series of discrete vessels, sixth means for successively transferring increments of said iron base melter to a series of discrete vessels, seventh means for successively adjusting the chemical components and thermal energies of said iron base melt increments in said series of discrete vessels to produce steel melt increments meeting predetermined specifications, eighth means including a storage vessel for successively combining said steel melt increments to produce a steel melt composite, ninth means for continuously casting said steel melt composite to form a continuous billet, and tenth means for continuously conditioning and working said continuous billet on line to produce a finished steel shape.

9. The system of claim 8 wherein said second means includes centrifugal means for spinning said iron base solids.

10. The system of claim 8 wherein units of said means are mounted on tracks for replacement by analogous units also mounted on said tracks.

11. The system of claim 8 where said discrete vessels are mounted for cyclic movement on a cyclically continuous track.

12. The system of claim 8 wherein said eight means includes a tundish vessel.

13. The system of claim 8 wherein said tenth means includes a series of rolling mills.

14. A continuous steelmaking process comprising the steps of spinning an iron base section at elevated temperature to remove nonferrous metal, supplying said section to a continuous electric heater for conversion to an iron base melt, successively transferring increments of said iron base melt to a series of discrete vessels, successively adjusting the chemical components and thermal energies of said increments of said iron base melt in said series of discrete vessels to produce increments of molten steel of predetermined specifications, successively combining said increments of molten steel to produce a composite steel melt, continuously casting said composite steel melt to form a continuous circular billet, and continuously conditioning and working said continuous billet on line to produce a finished shape.

15. The continuous steelmaking process of claim 14 wherein said iron base solids are steel scrap.

16. A continuous steelmaking process comprising the steps of spinning an iron base scrap section at elevated temperature to remove nonferrous metal, supplying said section to a continuous electric heater for conversion to an iron base melt, successively transferring increments of said iron base melt to a series of discrete vessels, successively adjusting the chemical components and thermal energies of said increments of said iron base melt in said series of discrete vessels to produce increments of molten steel of predetermined specifications, successively combining said increments of molten steel to produce a composite steel melt, continuously casting said composite steel melt to form a continuous billet, continuously conditioning and working said continuous billet on line to produce a finished shape, and simultaneously with said steps synchronizing said steps in such a way that adjacent ones of said steps are compatible.

17. The continuous steelmaking process of claim 16 wherein said continuous electric heater operates at a temperature ranging between 2,800° and 3,200° F.

18. The continuous steelmaking process of claim 16 wherein said chemical components include members of the class consisting of ferromanganese, ferrosilicon, coke, limestone and oxygen.

19. The continuous steelmaking process of claim 16 wherein said working is effected at a temperature ranging between 2,220° and 2,600° F.

20. A continuous steelmakig system comprising first means for supplying iron base sections, second means spinning such iron base sections at elevated temperature to remove nonferrous metal, third means including a continuous electric melter, delivering said iron base solids to said continuous electric melter for conversion to an iron base melt, fifth means including a series of discrete vessels, sixth means for successively transferring increments of said iron base melter to a series of discrete vessels, seventh means for successively adjusting the chemical components and thermal energies of said iron base melt increments in said series of discrete vessels to produce steel melt increments meeting predetermined specifications, eighth means including a storage vessel for successively combining said steel melt increments to produce a steel melt composite, ninth means for continuously casting said steel melt composite to form a continuous billet, tenth means for continuously conditioning and working said continuous billet on line to produce a finished steel shape, and eleventh means for synchronizing said means in such a way that adjacent ones of said means are compatible.